(12) United States Patent
Heinz et al.

(10) Patent No.: US 12,179,136 B2
(45) Date of Patent: Dec. 31, 2024

(54) LIQUID SEPARATOR

(71) Applicants:Joma-Polytec GmbH, Bodelshausen (DE); Karl Küfner GmbH & Co. KG, Albstadt (DE); Spörl KG Präzisions-Drahtweberei, Sigmaringendorf (DE)

(72) Inventors: Stefan Heinz, Bodelshausen (DE); Hannes Wölki, Rangendingen (DE); Ewald Müller, Bisingen (DE); Marcus Dreher, Balingen (DE); Martin Konzelmann, Winterlingen (DE); Bernd Stauß, Albstadt (DE); Martin Müller, Sigmaringen (DE); Richard Balzer, Sigmaringendorf (DE)

(73) Assignee: Joma-Polytec GmbH, Bodelshausen (DE)

( * ) Notice: Subject to any disclaimer, the term of this patent is extended or adjusted under 35 U.S.C. 154(b) by 366 days.

(21) Appl. No.: 17/772,731

(22) PCT Filed: Oct. 28, 2019

(86) PCT No.: PCT/EP2019/079422
§ 371 (c)(1),
(2) Date: Apr. 28, 2022

(87) PCT Pub. No.: WO2021/083486
PCT Pub. Date: May 6, 2021

(65) Prior Publication Data
US 2022/0347613 A1     Nov. 3, 2022

(51) Int. Cl.
*B01D 46/00*     (2022.01)
*B01D 46/10*     (2006.01)
(Continued)

(52) U.S. Cl.
CPC ......... *B01D 46/0031* (2013.01); *B01D 46/00* (2013.01); *B01D 46/10* (2013.01);
(Continued)

(58) Field of Classification Search
CPC ......... B01D 46/00; B01D 46/10; B01D 46/56
See application file for complete search history.

(56) References Cited

U.S. PATENT DOCUMENTS

| 6,080,228 A | 6/2000 | Okada |
| 2007/0294985 A1 | 12/2007 | Leseman |

FOREIGN PATENT DOCUMENTS

| CN | 102307642 A | 1/2012 |
| CN | 204932993 U | 1/2016 |

(Continued)

OTHER PUBLICATIONS

English Translation of International Search Report and Written Opinion for PCT/EP2019/079422, mailing date of search report Jun. 24, 2020. pp. 1-8.

(Continued)

*Primary Examiner* — Robert A Hopkins
(74) *Attorney, Agent, or Firm* — George R. McGuire; Bond, Schoeneck & King PLLC

(57) ABSTRACT

A liquid separator for separating liquid out of a gas/liquid mixture, including an inlet, an outlet, a flow path connecting the inlet to the outlet and at least one separating device arranged in the flow path, the liquid separator being designed and embodied with simple structure and a compact construction to enable reliable separation of liquids in such a way that the separating device has a fabric portion for liquid separation through which the flow path passes, the fabric portion being arranged at an angle of 1° to 15° relative to the main flow direction in the separating device.

19 Claims, 7 Drawing Sheets

(51) Int. Cl.
*B01D 46/121* (2022.01)
*B01D 46/42* (2006.01)
*B01D 46/56* (2022.01)

(52) U.S. Cl.
CPC ....... *B01D 46/121* (2022.01); *B01D 46/4263* (2013.01); *B01D 46/56* (2022.01); *B01D 2277/20* (2013.01)

(56) References Cited

FOREIGN PATENT DOCUMENTS

| | | | |
|---|---|---|---|
| CN | 207203743 U | * | 4/2018 |
| CN | 208212837 U | | 12/2018 |
| CN | 109260872 A | | 1/2019 |
| CN | 208727015 U | | 4/2019 |
| CN | 209147174 U | * | 7/2019 |
| DE | 10256388 B3 | | 7/2004 |
| DE | 102014013372 A1 | | 3/2016 |
| DE | 102016215721 A1 | | 2/2018 |
| DE | 202019005302 U1 | | 2/2020 |
| DE | 102020103804 A1 | | 10/2020 |
| EP | 1426091 A1 | | 6/2004 |
| GB | 190006698 A | | 5/1900 |
| ID | 17726 A | | 1/1998 |
| JP | 2001219198 A | | 8/2001 |
| KR | 101577242 B1 | | 12/2015 |
| WO | 20211608862 A1 | | 8/2021 |

OTHER PUBLICATIONS

Translated Chinese Notice of First Examination Opinion, App. No. 201980101820.0, dated Feb. 6, 2024, pp. 1-22.
Non-translated German Office Action, dated Apr. 6, 2023. pp. 1-6.

* cited by examiner

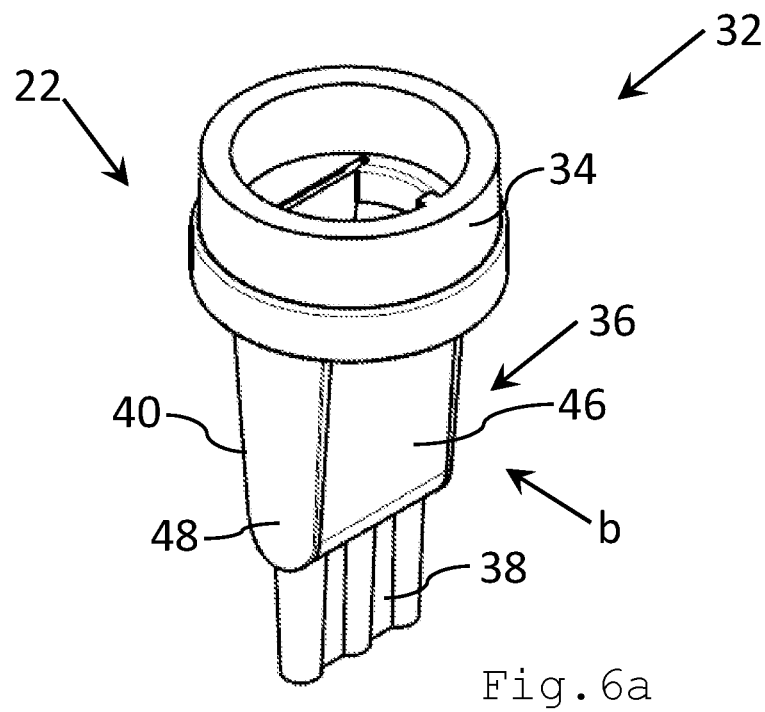
Fig.6a
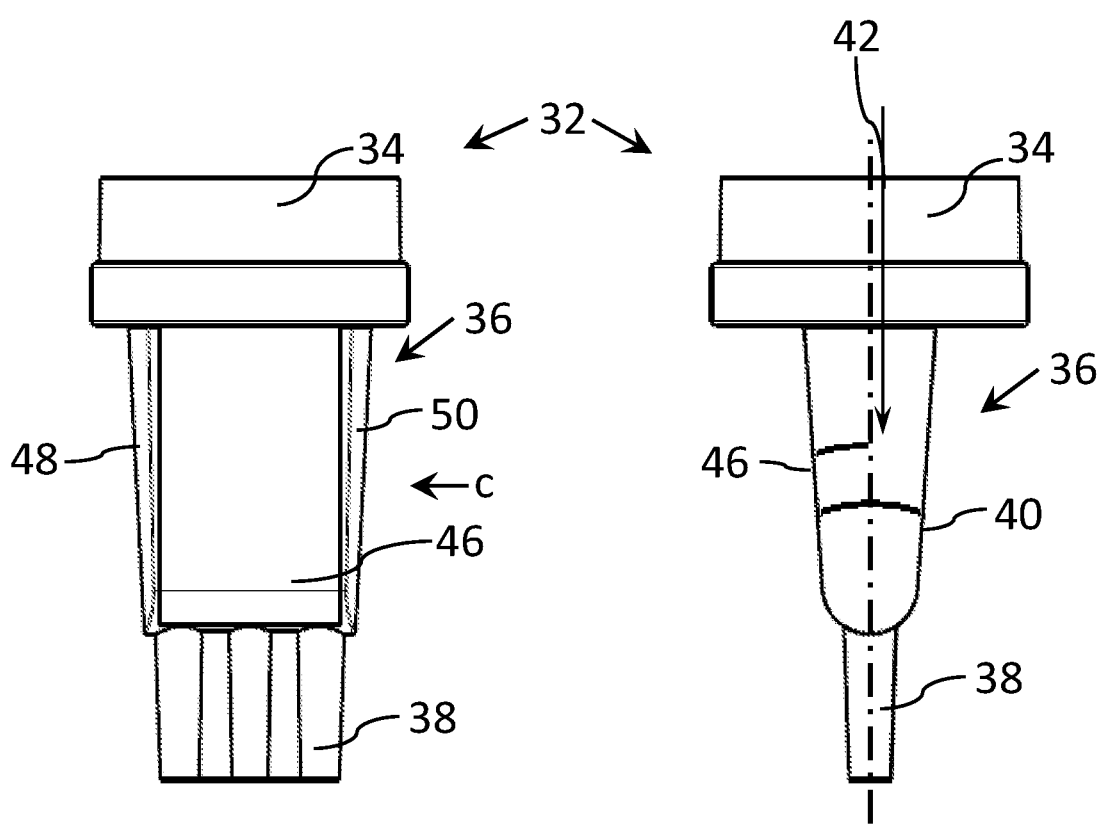
Fig.6b
Fig.6c

LIQUID SEPARATOR

CROSS REFERENCE TO RELATED APPLICATIONS

This is a National Stage Application filed under 35 U.S.C. 371 based on International Patent Application No. PCT/EP2019/079422, filed on Oct. 28, 2019, the entire disclosures of which is hereby incorporated herein by reference in its entirety.

BACKGROUND

The invention relates to a liquid separator for separating liquid out of a gas/liquid mixture.

Liquid separators are known from prior art, e.g., from DE 10 2014 013 372 A1, which shows a centrifugal water separator for a fuel cell system.

Liquid separators can work on the basis of various function principles, e.g., through condensation, centrifugal force (cyclone), sorption (use of a sorption agent), or baffle surfaces.

Liquid separators can, for example, be used in fuel cells in which water is separated from oxygen ($O_2$) on the cathode side with a liquid separator, and water is separated from hydrogen ($H_2$) on the anode side with a (further) liquid separator, to improve efficiency. Liquid separators are also used in compressed air systems or air conditioning systems.

However, it is problematic that conventional liquid separators require a considerable amount of space and/or exhibit very high flow resistance, depending on design. It is also detrimental that liquid separators usually can only work under specific ambient conditions, e.g. at room temperature.

SUMMARY OF THE INVENTION

The invention aims to facilitate reliable separation of liquids in a liquid separator via simple structural means and with a compact design. It is desirable that the liquid separator can be operated reliably and regardless of the ambient conditions.

The invention achieves this object with a liquid separator.

The liquid separator serves to separate liquid from a (flowing), particularly steam- or mist-like, gas/liquid mixture (gas flow containing liquid).

The gas/liquid mixture is particularly a mixture in which gas serves as a carrier medium and liquid is present in the form of finely distributed liquid drops.

The liquid separator comprises an inlet (gas/liquid mixture inlet), an outlet (gas outlet), and a flow path connecting the inlet with the outlet (flow connection). The flow path comprises at least one separating device where the actual separation of liquid from the gas/liquid mixture takes place. The separated liquid can be a pure liquid or a liquid mixture (mixture of two or more different liquids).

The liquid separator is characterized in that the separating device comprises a fabric portion for liquid separation through which the flow path leads, whereby the fabric portion is arranged at an angle of 1° to 15°, preferably from 1.5° to 10°, ideally from 2° to 4°, relative to the main flow direction in the separating device. The main flow direction is particularly oriented in or parallel to the middle longitudinal direction of the separating device.

The separating device suggested here can be used to separate liquid (e.g., water) from the gas/liquid mixture at the fabric portion, i.e., liquid remains at the fabric portion. The gas (e.g., air or hydrogen) can however pass through the fabric portion and be led to the outlet (gas outlet). In other words, liquid can be separated from the gas flow upon making contact with the fabric portion. High levels of separation can be achieved with a relatively compact design.

With the separating device suggested here, there is provided a "fabric separator" for separating liquids (e.g., water) from gas flows (e.g., air or hydrogen) as a baffle separator. The gas/liquid mixture flow to the fabric can occur at a specified angle and at a specified minimum speed. It is possible that the flow of a gas/liquid mixture in a process can be used, for example, or that the gas/liquid mixture is brought to a specified flow speed, e.g., via a turbine or a pump, before being led to the liquid separator. It is also possible that the gas/liquid mixture can be brought to a specified flow speed by reducing a flow cross section before being led to the liquid separator.

With a preferred configuration, the separating device can comprise a second fabric portion for liquid separation through which the flow path leads, whereby the second fabric portion is positioned opposite the first fabric portion and, with the first fabric portion, forms an angle of 1° to 30°, preferably 2° to 20°, ideally 4° to 8°. With a compact structure a relatively large separating surface is provided. This can keep any loss in pressure relatively minor.

It is beneficial if the first fabric portion and the second fabric portion are symmetrically arranged relative to the main flow direction in the separating device (positioned in or parallel to the middle longitudinal direction of the separating device). This symmetry aids the flow conditions, as the flow path at the separating device can be branched into two sub-paths, which then lead to the outlet (gas outlet). The symmetrical arrangement can create two equally strong sub-paths.

The separating device can comprise a U-shaped or V-shaped cross section in the fabric portions (fabric holder of the separating device) that is closed on the front, e.g., with a front partition (U or V are closed "to the back" and "to the front" via a front partition"). It is also possible for the separating device to comprise the shape of a cone, frustum, pyramid, or truncated pyramid in the fabric portions (fabric holder).

In a preferred variant, the fabric portion(s) can be made from metal fabric, whereby a heating device is preferably provided, via which the fabric portion(s) can be heated. By using metal tissue a relatively robust variant of the device can be achieved. A heating device aids in the universal usability of the liquid separator, as it can be used in freezing temperatures (temperatures below freezing). Freezing of the liquid separated at the fabric portion(s) can thereby be prevented.

The heating device can be electrically powered, in particular as a direct heating device. For a structurally simple variant it can, for example, be designed as a resistance heater. For example, the fabric portions can comprise electrical connections via which power is supplied.

The fabric portions can both be made from a metal fabric and both be heatable. A heating device can be provided for both fabric portions (structurally simple and affordable), or one heating device can be provided for each fabric portion (more reliable due to independent operation).

Alternatively, the fabric portion(s) can each be made from plastic fabric. This allows for a structurally simple and affordable variant. The overall weight of the device is thus also lighter.

In a preferred variant, the fabric portion(s) can comprise a hydrophilic coating. A hydrophilic coating aids in the level of separation of liquid from the gas/liquid mixture (i.e., the amount of liquid separated).

The fabric portion(s) can comprise fabric threads or wires comprising two thread or wire systems that are oriented perpendicular or parallel to one another (thereby forming a fabric portion). The fabric threads or wires from the fabric portion(s) that are oriented perpendicular to the main flow direction in the separating device (middle longitudinal flow direction of the separating device) (first thread or wire system) can comprise a greater thickness than the fabric threads (second thread or wire system) oriented (vectorially proportionally) lengthwise relative to the main flow direction. Because these fabric threads or wires are thicker, the clear cross section of the fabric portion, i.e., the open cross section (not filled with fabric threads) facing along the main flow direction (middle longitudinal direction) can be reduced. This increases the level of separation.

In an expedient variant, the separating device can comprise a housing at or in which the components of the separating device are arranged and/or fastened, whereby the housing can optionally be made from plastic or metal. With a housing, the components of the separating device can be secured against each other and the separating device can be handled as one unit or assembly. A plastic housing can be more easily produced and/or have a lighter weight. A metal housing can be used for a more robust variant.

In a preferable variant, a heating device can be provided via which the housing can be heated. In particular, a heating device can be provided for a metal housing and fosters the use of the liquid separator at freezing temperatures. The heating device can be embodied to be electrically powered, e.g., as a direct heating device, as described above.

The housing of the separating device can comprise a fabric holding portion at or in which the fabric portions are arranged and/or fastened. Furthermore, the housing can comprise a connection portion attached to the fabric holding portion (upstream, i.e., to the inlet). The connection portion can, for example, comprise an annular cross section enlarged relative to the fabric holding portion. In addition, the housing can comprise a diverter gill connected to the fabric holding portion, in particular on the side facing away from the connection portion (downstream).

As already described, the housing of the separating device (downstream from the fabric portion) can comprise a diverter gill or diverter canal. This aids in water diversion, as liquid separated at the separating device, e.g., in drop form, can be led to a liquid diverter or liquid reservoir. The diverter gill or diverter canal can lead to or open to a wall, for example, that separates the separating device from a liquid reservoir. The diverter gill or diverter canal preferably leads to the minimum fill level of the (separated) liquid, provided storage of the liquid is beneficial.

In a preferable variant, the separating device may have a coat that (radially) surrounds the separating device towards the outside, whereby the coat is a, preferably circumferential, fabric layer made of metal fabric or plastic fabric. This aids in separation because liquid particles that have passed through a fabric portion of the separating device can be separated at the coat or its fabric layer. The outer coat is also located in the flow path that connects the inlet to the outlet. In other words, the flow path leads through the fabric layer of the outer coat. A metal fabric makes the fabric layer more robust. A plastic fabric is more affordable and structurally favorable. The coat can comprise a frame to which the fabric layer is fastened.

It is beneficial if a heating device is provided, via which the fabric layer can be heated. A heating device helps with the universal useability of the liquid separator, as it can also be used in freezing temperatures. The heating device can be electrically powered. In case of metal fabric, the heating device can also be a direct electric heating device, e.g., as resistance heating, as described above.

It is expedient if the fabric layer comprises a hydrophobic coating. This coating repels liquid and ensures that liquid still within the gas flow is contained in the space between the coat and separating device. This improves the separation rate.

In a preferable variant, the mesh width of the fabric layer of the coat can be less than the mesh width of the fabric portion(s) of the separating device. This also improves the separation rate, as water drops accumulated at the separating device or its fabric portions can be taken up into the gas flow (again) and captured.

It is preferable if the liquid separator comprises a liquid reservoir where the liquid separated by the separating device or separated at the coat is collected. This prevents the need for continuous liquid diversion, as it is collected and continuously diverted in the liquid reservoir. The amount of separated liquid is easier to monitor.

The liquid reservoir can comprise a liquid outlet, in particular at a lower area in the installation position of the liquid separator, that can optionally comprise an operable or actuatable valve.

It is expedient if the liquid reservoir comprises a rotationally symmetrical cross section. This allows approximately similar fill levels to be achieved in different positions/installation positions or states. This facilitates monitoring of the amount of separated liquid. The liquid reservoir can optionally comprise a conical cross section, whereby the cross section toward the separating device (radial) expands.

In a preferable variant, a fill level sensor may be provided via which the fill level of the liquid captured in the liquid reservoir can be determined. This facilitates monitoring of the fill level. For example, when one or more fill level thresholds (minimum and/or maximum fill level) are achieved, a signal output can be issued. Alternatively a continuous signal output is also possible. The fill level sensor can be a capacitive sensor. The capacitive sensor can be arranged in or parallel to the middle longitudinal direction of the liquid reservoir.

It is beneficial if a wall is present that separates the liquid reservoir from the housing part of the liquid separator, which contains the separating device, whereby the wall comprises an external slope facing (radially) away from the separating device with one or more marginal openings. The wall can largely prevent the inclusion of liquid captured in the liquid reservoir in the gas flow. The wall can also serve as a "baffle plate", which prevents the splashing of liquid out of the liquid reservoir. Liquid, e.g., from the diverter gill, can flow along the slope of the wall and enter the liquid reservoir via the marginal openings. The wall can comprise a bowl- or cone-shaped cross section (descending outward).

Alternatively, a wall may be present that separates the liquid reservoir from the housing part which contains the separating device, whereby the wall comprises an internal slope facing away from the separating device with one or more openings. The wall can comprise a funnel-shaped cross section. Such a variant can also largely prevent the inclusion of liquid captured in the liquid reservoir in the gas flow. The wall can also serve as a "baffle plate". Liquid, e.g., from the diverter gill, can flow along the slope of the partition and enter the liquid reservoir via the openings.

In a preferable variant the housing of the liquid separator can be made from plastic. This facilitates a structurally simple variant with a light weight. This also allows for affordable production, e.g., through injection molding. The housing can comprise a housing part (top part) where the separating device is located, and another housing part (bottom part) where the liquid reservoir is located.

Tests have shown that, for good results, the fabric should be at an angle between 1-15°, preferably 1.5-10°, ideally 2-4°, with the main flow direction (middle longitudinal direction) of the gas flow in the separating device.

Tests with an air-water mixture have shown that the gas flow containing liquid (gas/liquid mixture) should reach the fabric at a flow speed greater than 5 meters per second (>5 m/s), ideally greater than 12 meters per second (>12 m/s), depending on the desired level of separation. The flow speed may potentially have to be adjusted for other gas/liquid mixtures.

The level of separation will decrease with the tested air-water mixture from a flow speed of less than 12 meters per second (<12 m/s). The level of separation is no longer significantly increased at more than 12 meters per second (>12 m/s).

Very good test results were achieved with an angle of 8° between the fabric portions. A fabric thread or wire thickness of 160 µm also proved advantageous.

As already indicated, the gas/liquid mixture must be led to the liquid separator at a specific flow speed. The flow energy of a gas/liquid mixture (e.g., flowing in a process) can be used, for example. Alternatively, or in addition to this, the gas/liquid mixture can be brought to the required flow speed with a pump or turbine.

BRIEF DESCRIPTION OF THE DRAWINGS

The invention is described in greater detail below with the figures, whereby equivalent or functionally equivalent elements have the same references, or are only specified with their reference once if necessary. The following figures show:

FIG. 6*a-c* the liquid separator, perspective view (FIG. 6*a*), front view (FIG. 6*b*), and side view (FIG. 6*c*);

DETAILED DESCRIPTION

Figure 1:
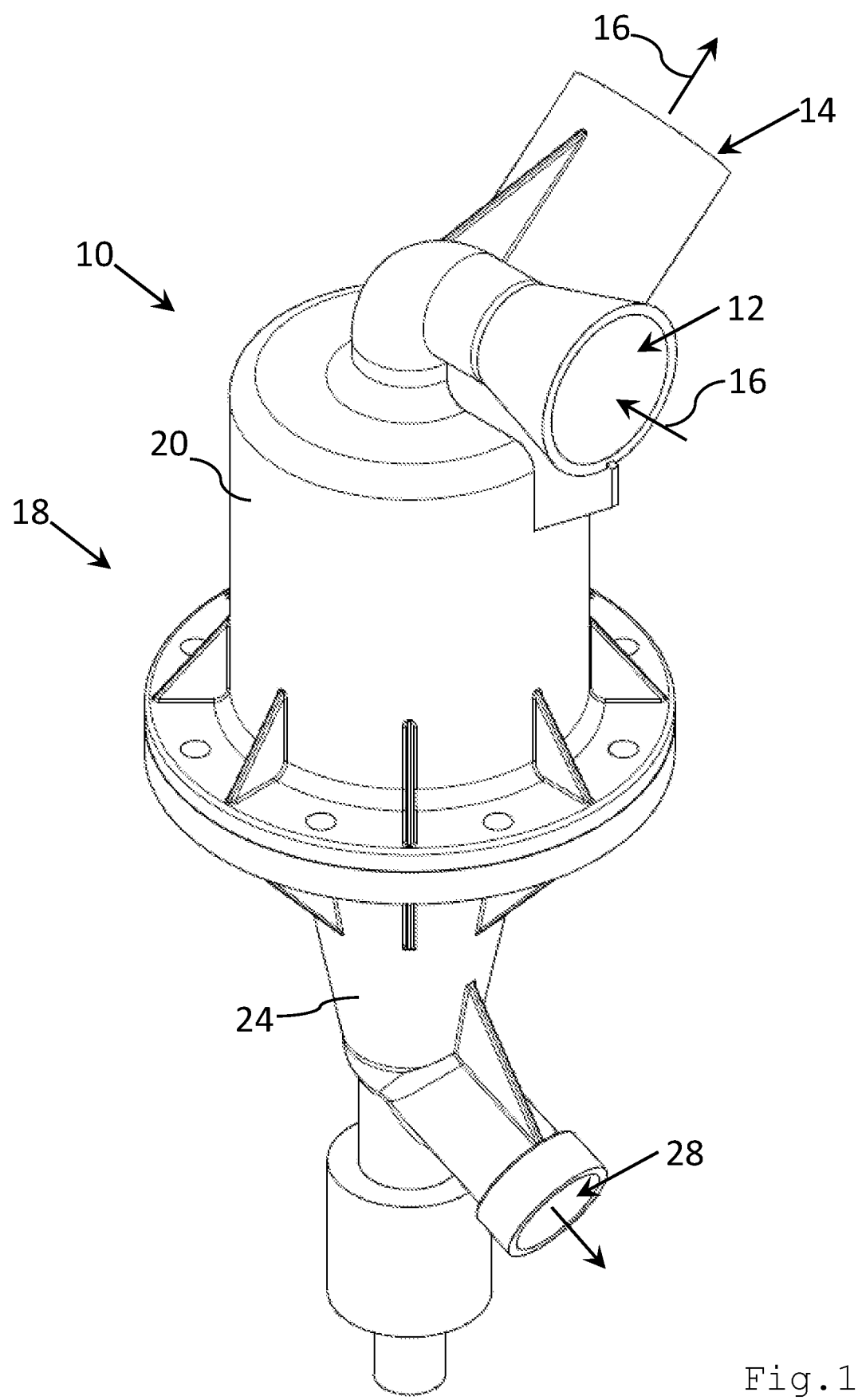
FIG. 1 a variant of a liquid separator, in a perspective view.

FIG. 1 shows a liquid separator for separating liquid from a flowing gas/liquid mixture, whereby the liquid separator overall is labeled with the reference 10.

Figure 2:
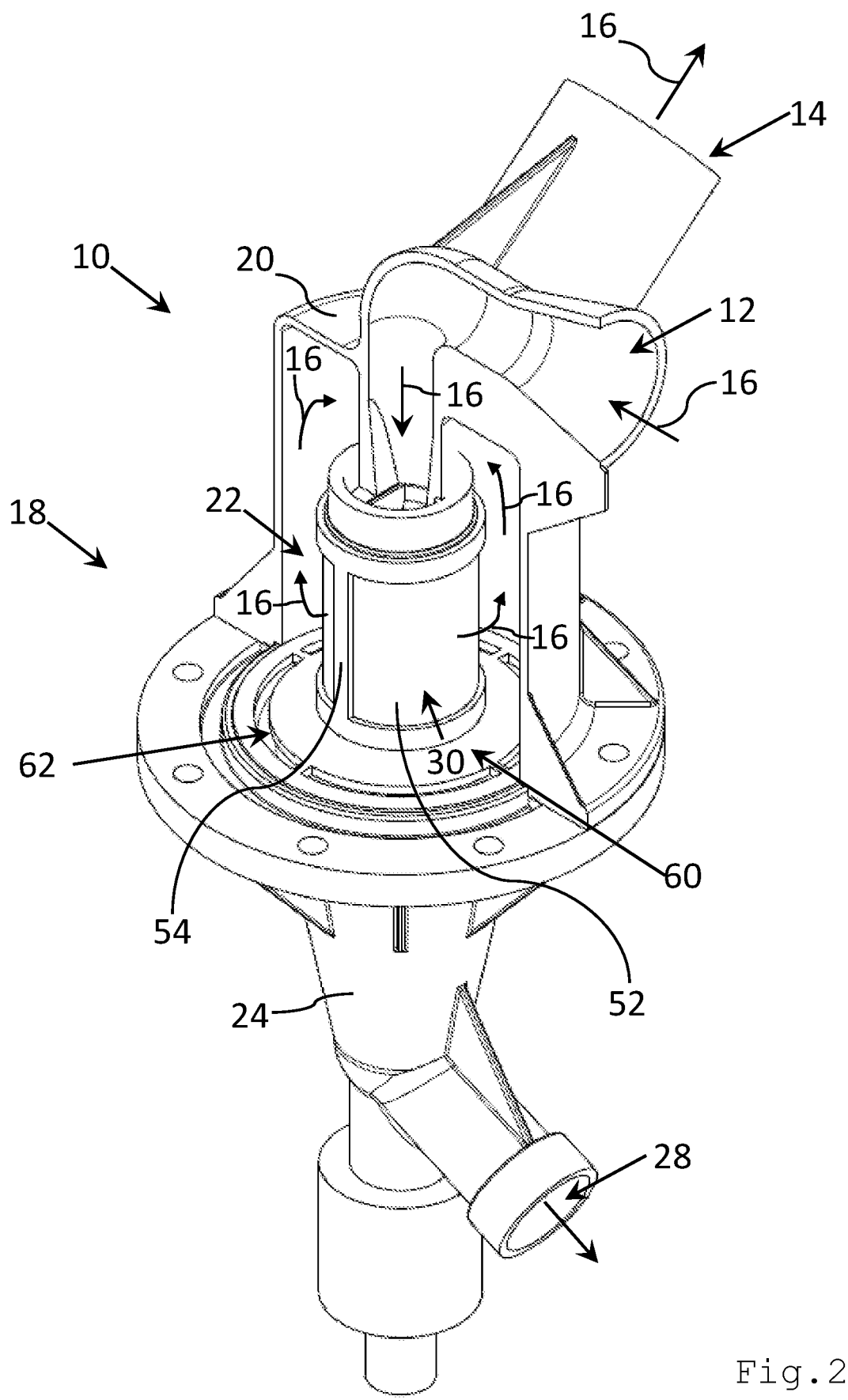
FIG. 2 the liquid separator from FIG. 1, whereby the top of the housing is cut open.
Figure 3:
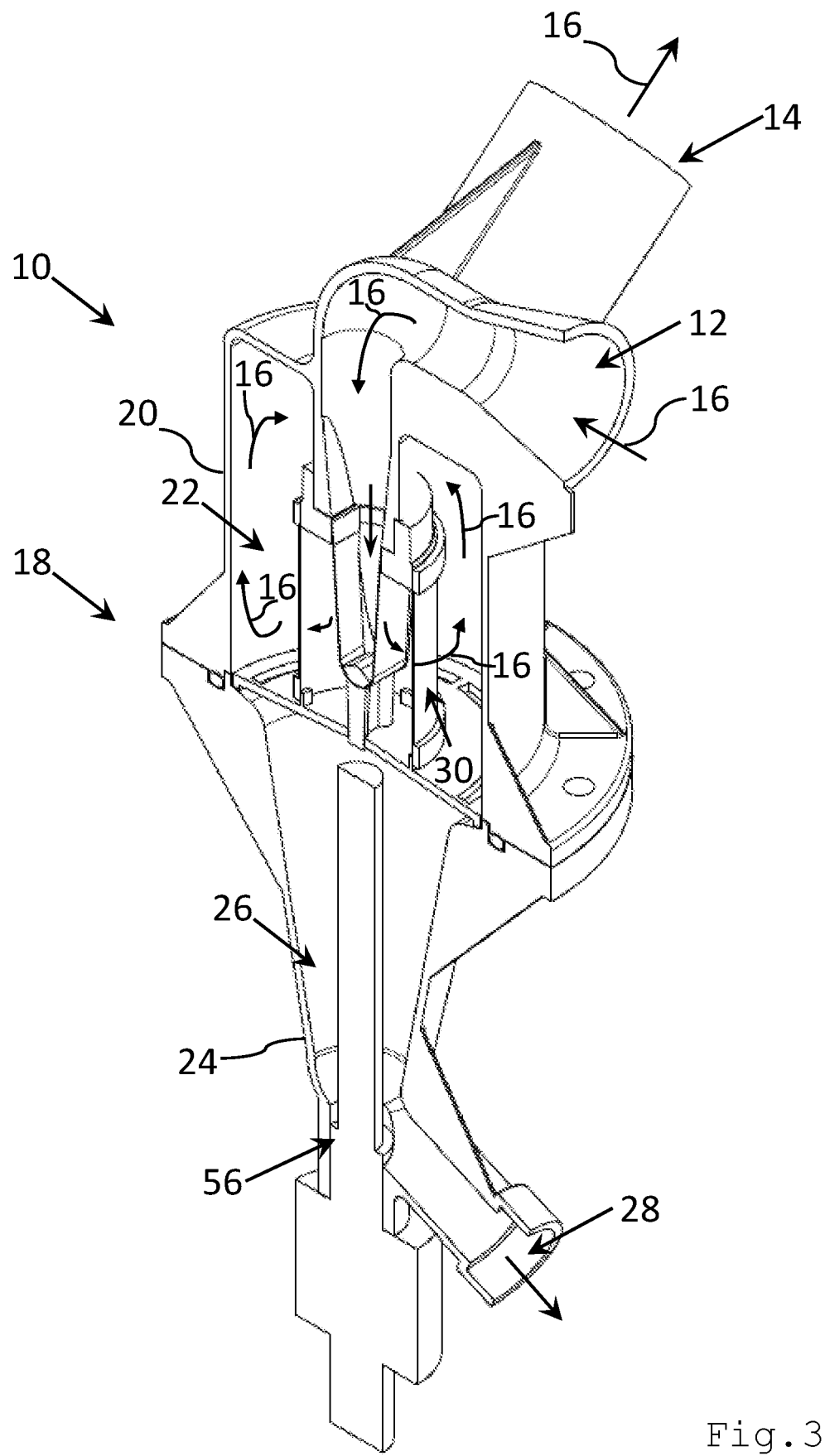
FIG. 3 the liquid separator from FIG. 1, whereby the top and bottom of the housing are cut open.
Figure 4:
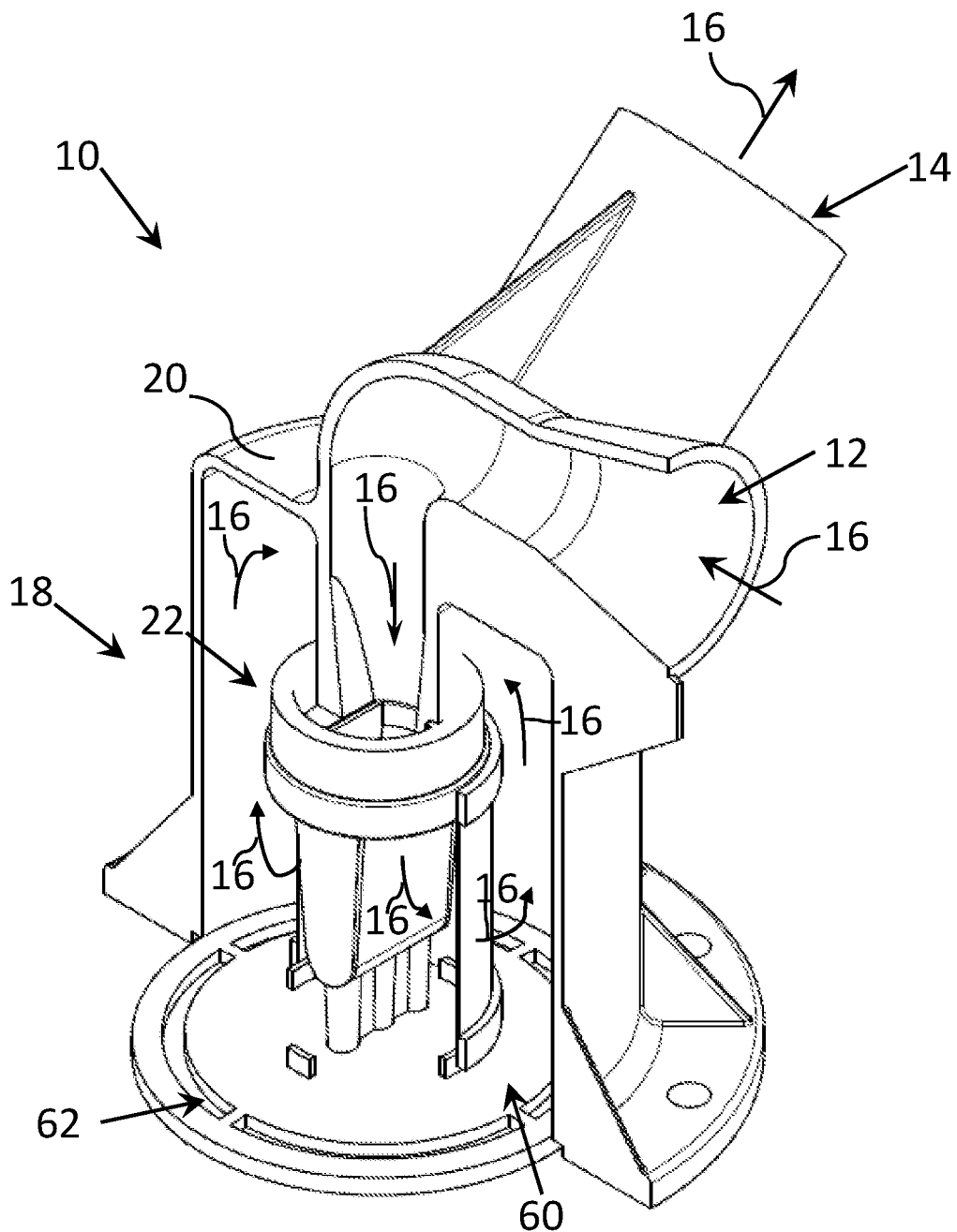
FIG. 4 the liquid separator from FIG. 1, enlarged view, whereby the housing top and coat of the separating device are cut open.
Figure 5:
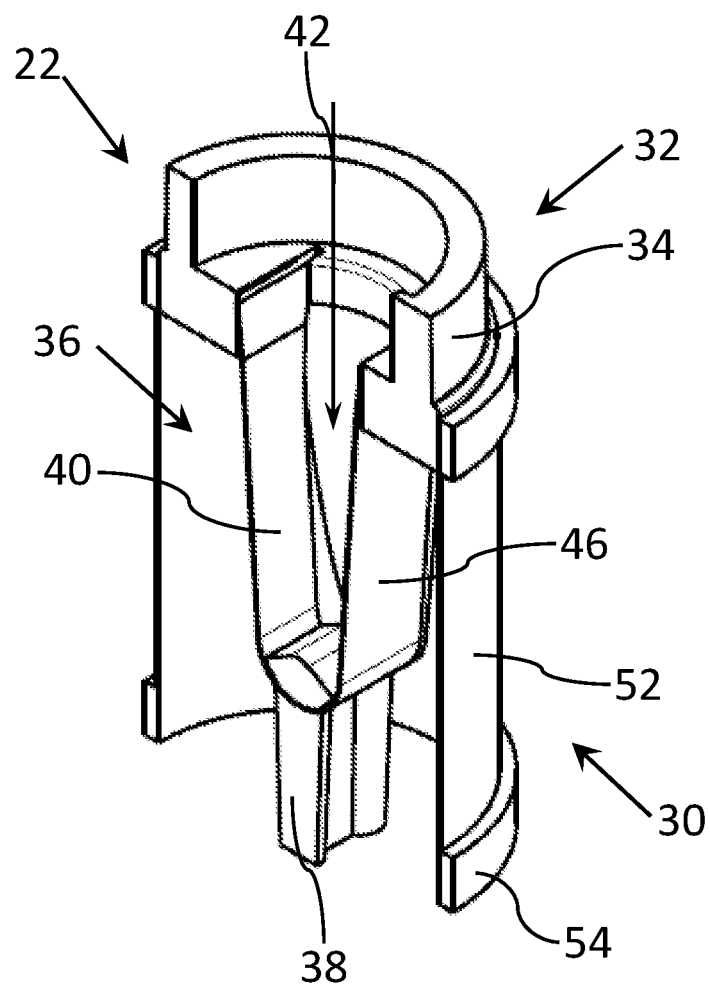
FIG. 5 the separating device of the liquid separator from FIG. 1, interior view.
Figure 7:
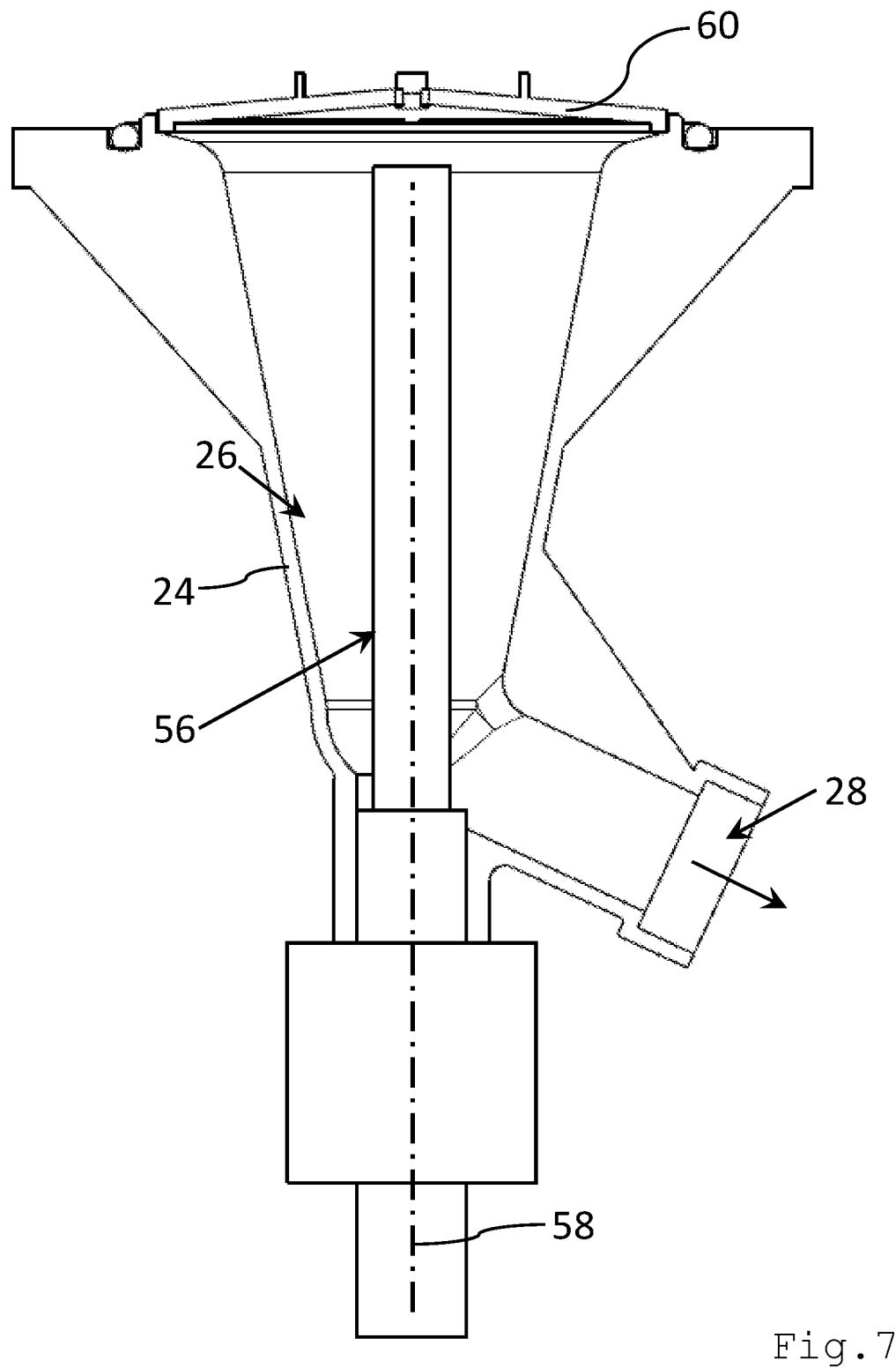
FIG. 7 the top of the housing of the liquid separator from FIG. 1, interior view.

The liquid separator 10 comprises an inlet 12 (gas/liquid inlet 12), an outlet 14 (gas outlet 14), and a flow path 16 connecting the inlet 12 with the outlet 14 (flow path 16 throughout the entirety of the columns with reference 16, leading from the inlet 12 to the outlet 14; see FIG. 2 or 3).

The liquid separator 10 comprises a housing 18 at or in which the components of the liquid separator 10 are arranged and/or attached. The housing 18 comprises a first housing part 20 (housing top 20) containing a separating device 22, and a second housing part 24 (housing bottom 24) containing a liquid reservoir.

The flow path 16 describes the path that a gas flow (containing liquid) follows when it is led into the inlet 12 as a gas/liquid mixture, led through the separating device 22 (where the liquid is separated), and led out through the outlet 14 as a gas flow (largely without any liquid if any). The flow path 16 thus constitutes the path of a flow connection leading from the inlet 12 through the separating device 22 to the outlet 14. The flow path or flow connection 16 is outwardly bordered by the components and partitions (without separate references) of the liquid separator 10.

The inlet 12 and outlet 14 are positioned at the first housing part 20. The second housing part 24 comprises a liquid outlet 28 through which separated liquid can be diverted from the liquid reservoir 26. Regardless, the housing 18 can be made from plastic.

The separating device 22 is arranged in the first housing part 20 and is surrounded radially outwards by a coat 30, which is also arranged in the first housing part 20 (see FIGS. 2 to 5).

The separating device 22 comprises a housing 32 at or in which the components of the separating device 22 are positioned and, if applicable, attached. The housing 32 comprises a connection portion 34 with an annular cross section, a fabric holding portion 36, and a diverter gill 38. The connection portion 34 serves to connect the separating device 22 to, for example, a pipeline leading from the inlet 12. The connection portion 34 can be radially expanded relative to the fabric holder 36.

The fabric holding portion 36 comprises fabric portions for liquid separation. The separating device 22 comprises a first fabric portion 40 for liquid separation, through which the flow path 16 leads (first sub-flow), whereby the first fabric portion 40 is positioned at an angle of 1° to 15° relative to the main flow direction 42 in the separating device 22 (see FIGS. 5 and 6). The main flow direction 42 is oriented along or parallel to the middle longitudinal direction 44 of the separating device 22.

The separating device 22 also comprises a second fabric portion 46 for liquid separation, through which the flow path 16 (second sub-path) leads, whereby the second fabric portion 46 is positioned opposite the first fabric portion 40 and, with the first fabric portion 40 forms an angle of 2° to 30°. The first fabric portion 40 and second fabric portion 46 are symmetrically positioned relative to the main flow direction 42 in the separating device 22. The gas flow containing liquid is divided into two sub-flows (first and second sub-flow) at the separating device 22.

The separating device 22 comprises a U- or V-shaped cross section at the fabric holding portion 36 that is enclosed on the front by a front partition (48, 50, respectively) (see FIGS. 6*a* to 6*c*).

The fabric portions 40, 46 can each be made from plastic fabric or metal fabric. In case of a metal fabric in particular, a heating device can be optionally provided (not pictured) via which the fabric portions 40, 46 can each be heated. The heating device can be an electrically powered heating device, preferably as a direct heating device, e.g., in the form of resistance heating, as described above.

Optionally, the fabric portions 40, 46 of the separating device 22 can comprise a hydrophilic coating. Regardless, the fabric threads or wires of the fabric portions 40, 46, oriented perpendicular to the main flow direction 42 of the separating device 22, can comprise a greater thickness than the fabric threads or wires that are at least vectorially partially oriented lengthwise relative to the main flow direction 42.

As described above, the separating device 22 comprises a housing 32 at or in which the components of the separating device 22 are arranged and, if applicable, attached. The housing 32 can be made from plastic or metal. In case of a metal housing 32 in particular, a heating device can be optionally provided (not pictured) via which the housing 32 can be heated. This can be an electrically powered heating device, e.g., in the form of a direct heating device, as described above.

The coat 30 comprises an at least largely or entirely circumferential fabric layer 52 made from metal fabric or plastic fabric. The fabric layer 52 is attached to a frame 54 of the coat 30 or held in place by such. In case of a fabric layer 52 made from metal fabric in particular, a heating device may be provided via which the fabric layer 52 can be heated. This may be an electric heating device, e.g., in the form of direct heating, as described above.

The fabric layer 52 can comprise a hydrophobic coating. Regardless of this, the mesh width of the fabric layer 52 of the coat 30 can be less than the mesh width of the fabric portions 40, 46.

As described above, the liquid separator 10 comprises in its second housing part 24 (housing bottom 24) a liquid reservoir 26 in which liquid separated at or through the separating device 22 and/or the coat 30 is captured. The captured liquid can be intermittently diverted via the liquid diverter 28, e.g., via operation of a valve installed at or in the liquid diverter 28.

The liquid reservoir 26 comprises a rotationally symmetrical cross section. The cross section of the second housing part 24 expands radially toward the separating device 22.

An optional fill level sensor 56 is also provided, via which the fill level of the liquid captured in the liquid reservoir 26 can be determined. This facilitates monitoring of the fill level or threshold values of the fill level. The fill level sensor 56 is a capacitive sensor and is oriented along the middle longitudinal direction 58 of the liquid reservoir 26.

A wall 60 is also provided that separates the liquid reservoir 26 from the first housing part 20 where the separating device 22 is located. The wall 60 comprises a slope towards the (radial) outside facing away from the separating device 22 with one or more marginal openings 62.

The diverter gill 38 can lead to the wall 60 or open up into the wall 60. Liquid separated at the separating device 22 can flow to the wall 60 via the diverter gill 38. Here the liquid reaches the openings 62 via the slope on the wall 60, where the liquid can flow into the liquid reservoir 26.

The housing of the liquid reservoir 10, i.e., the first housing part 20 and the second housing part 24, can be made from plastic.

The liquid separator 10 works as follows:

A flowing gas/liquid mixture (gas flow containing liquid) is led through the inlet 12 into the liquid separator 10. A pipe guide (without reference) is used to lead the gas/liquid mixture into the separating device 22 where the liquid is actually separated. To this end, the gas/liquid mixture is led through the fabric portions 40, 46, whereby liquid remains at the fabric portions 40, 46 and the gas flow (which may still contain some liquid) passes through the fabric portions 40, 46. The gas flow is then divided into two sub-flows, as described above.

The gas flow (which may still contain some liquid) is then led through the fabric layer 52 of the coat 30, whereby any residual liquid is separated. The gas flow passes through the fabric layer 52 and then passes along the flow path 16 through the outlet 14 and exits the liquid separator 10.

The liquid separated at the fabric portions 40, 46 flows (e.g., via gravity) via the diverter gill 38 to the wall 60. Liquid separated at the fabric layer 52 also reaches the wall 60 (e.g., via gravity).

The liquid reaches the openings 62 via the slope on the wall 60, from which it can flow to the liquid reservoir 26. Separated liquid can be diverted from the liquid reservoir 26 via the liquid diverter 28.

The invention claimed is:

1. Liquid separator for separating liquid out of a gas/liquid mixture, comprising an inlet, an outlet, a flow path connecting the inlet to the outlet and at least one separating device arranged in the flow path, characterized in that the separating device has a fabric portion for liquid separation through which the flow path passes, said fabric portion being arranged at an angle of 1° to 15° relative to a main flow direction in the separating device, and that fabric threads or wires of the fabric portion, oriented perpendicular to the main flow direction in the separating device, are thicker than fabric threads or wires of the fabric portion oriented lengthwise to the main flow direction.

2. Liquid separator according to claim 1, characterized in that the separating device comprises a second fabric portion for liquid separation, through which the flow path passes, whereby the second fabric portion is positioned opposite the first fabric portion and, with the first fabric portion, forms an angle of 2° to 30°.

3. Liquid separator according to claim 2, characterized in that the first fabric portion and the second fabric portion are symmetrically arranged in the separating device relative to the main flow direction.

4. Liquid separator according to claim 1, characterized in that the fabric portion is made from metal fabric.

5. Liquid separator according to claim 1, characterized in that the fabric portion is made from plastic fabric.

6. Liquid separator according to claim 1, characterized in that the fabric portion comprises a hydrophilic coating.

7. Liquid separator according to claim 1, characterized in that the separating device comprises a housing on or in which the components of the separating device are attached, whereby the housing is made from plastic or metal.

8. Liquid separator according to claim 7, characterized in that a heating device is provided by which the housing is heatable.

9. Liquid separator according to claim 7, characterized in that the housing of the separating device comprises a diverter gill or diverter canal.

10. Liquid separator according to claim 1, characterized in that the separating device comprises a coat that surrounds the separating device towards the outside, whereby the coat has a fabric layer of metal fabric or plastic fabric.

11. Liquid separator according to claim 10, characterized in that there is a heating device provided by which the fabric layer is heatable.

12. Liquid separator according to claim 10, characterized in that the fabric layer comprises a hydrophobic coating.

13. Liquid separator according to claim 10, characterized in that a mesh width of the fabric layer of the coat is less than a mesh width of the fabric portion of the separating device.

14. Liquid separator according to claim 1, characterized in that the liquid separator comprises a liquid reservoir in which liquid separated at the separating device is collected.

15. Liquid separator according to claim 14, characterized in that the liquid reservoir comprises a rotationally symmetrical cross section.

16. Liquid separator according to claim 14, characterized in that a fill level sensor is provided by which the fill level of the liquid collected in the liquid reservoir is determinable.

17. Liquid separator according to claim 14, characterized in that there is a wall that separates the liquid reservoir from a housing part in which the separating device is located, whereby the wall comprises an outward incline facing away from the separating device with one or more openings on a margin of the wall.

18. Liquid separator according to claim 14, characterized in that there is a wall that separates the liquid reservoir from the housing part where the separator device is located, whereby the wall comprises an inner incline facing away from the separating device with one or more openings.

19. Liquid separator according to claim 1, characterized in that the liquid separator comprises a housing at or in which the components of the liquid separator are arranged and/or attached, and in that the housing of the liquid separator is made from plastic.

\* \* \* \* \*